United States Patent
Stringham

(10) Patent No.: US 6,268,745 B1
(45) Date of Patent: Jul. 31, 2001

(54) WIRED-AND BUS INTERFACE CIRCUIT FOR GALVANICALLY ISOLATING NODES

(75) Inventor: Gary G. Stringham, Boise, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/556,017

(22) Filed: Apr. 20, 2000

(51) Int. Cl.⁷ .............................................. H03K 19/0175
(52) U.S. Cl. .................................. 326/82; 326/86
(58) Field of Search ................... 326/41, 86, 82

(56) References Cited

U.S. PATENT DOCUMENTS

| | | | |
|---|---|---|---|
| 3,967,059 | * 6/1976 | Moore, III et al. | 178/58 A |
| 4,887,262 | 12/1989 | van Veldhuizen | 370/85.1 |
| 5,551,053 | 8/1996 | Nadolski et al. | 395/829 |
| 5,901,325 | 5/1999 | Cox | 395/821 |
| 5,923,186 | * 7/1999 | Suggs | 326/82 |
| 5,936,424 | * 8/1999 | Young et al. | 326/39 |

OTHER PUBLICATIONS

1) CiA doucument, describing CAN "Physical Layer", 23 pages.
2) Keil Software document, "CAN, A brief introduction to Controller Area Network", 18 pages.
3) KVASER, "CAN Patents", last modified Jan. 13, 2000, 2 pages.
4) Hitex UK Ltd., "Controller Area Networking", released Jan. 1995, 5 pages.

* cited by examiner

Primary Examiner—Michael Tokar
Assistant Examiner—Anh Tran
(74) Attorney, Agent, or Firm—Anthony J. Baca

(57) ABSTRACT

There is disclosed in interface circuit that nodes on a bus to be galvanically isolated while still having a wired-AND functionality. Once nodes are galvanically isolated, a transceiver can be placed in the bus structure and allow for wire-less communication across the bus without adding additional delays or routing complexity.

15 Claims, 3 Drawing Sheets

WIRED-AND BUS INTERFACE CIRCUIT FOR GALVANICALLY ISOLATING NODES

BACKGROUND OF THE INVENTION

Controller Area Network (CAN) technology, as its name implies, is a network established among microcontrollers. Like computer networks, it has the similar transmission protocol defined by ISO/OSI (International Standard Protocol/Open System Interconnection) 7-layer model. However, unlike computer networks, it uses a simplified 7-layer model in which only 2 of the lowest stacks were defined, i.e. Data-Link Layer and Physical Layer. This simplification allows the protocol to be more "open" than computer networks, i.e. it allows the users freedom to develop their own applications. CAN offers Error Detection/Confinement ability in which the feature is burnt into the silicon during manufacturing. This significantly reduces the burden of the microcontroller in verifying the CAN signal on the bus. The failure node determines itself and retransmit the signal upon detecting the failure in transmission.

CAN was first established for automobiles in mid 1986. The first CAN chip was available in 1987 by Intel. After which, many companies adopted the CAN technology to develop higher level protocols.

CAN consists of a single bit-serial channel for all information. Transmission and reception of data, bit timing and bus arbitration all take place on what is logically a single line. The CAN Physical Layer defines the electrical levels and signaling scheme on the bus, the cable impedance and similar things. The physical layer characteristics are not part of the basic CAN specification. The bus is a single wire plus ground with every node connected to the bus such that every node receives every message. The most common implementation of the physical layer, as defined by ISO 11898, is a two-wire balanced signaling scheme. Several CAN transceiver chips are manufactured by Philips, such as the 82C250 transceiver which implements the physical layer defined by ISO 11898. The ISO 11898 prescribes that the cable impedance be nominally 120 Ohms, but an impedance in the interval of [108 . . . 132] Ohms is permitted.

The CAN bus uses Non-Return To Zero (NRZ) with bit-stuffing. There are two different signaling states: dominant (logically 0) and non-dominant (logically 1). These correspond to certain electrical levels which depend on the physical layer used. The modules are connected to the bus in a wired-AND fashion: if one node is driving the bus to the dominant state, then the whole bus is in that state regardless of the number of nodes transmitting a non-dominate state. This requirement that if one node is driving the bus to the dominant state, then the whole bus is in that state regardless of the number of nodes transmitting a non-dominate state is fundamental to bus arbitration. In particular, bus arbitration for control of the bus takes place while the arbitration field, which is the first field transmitted, is transmitted. If a node, which is sending a non-dominate state, sees that the bus is in the dominate state, it recognizes that another node is transmitting a higher priority message and stops transmitting.

In some systems it is desirable to connect two CAN buses over a great distance. Because of signal degradation, the distance total distance of the bus has an upper limit. Other systems may wish to wireless connect nodes using, for example infrared (IR) or radio frequencies (RF). To reach great distances or use a wireless media it is often necessary to use a galvanically isolate the nodes. However, galvanically isolated nodes on a wired-AND bus are prone to a lock-up condition. When a galvanic isolator receives a dominate state on a first bus, it must drive the second bus to the dominate state, However, the galvanic isolator now receives a dominate state on the second bus, which causes the galvanic isolator to drive the first bus to the dominate state. The galvanic isolator is driving both buses to the dominate state and no other node may change the bus back to the non-dominate state, thus the bus is "locked-up".

Nodes on a local bus can be logically connected through controller connected to nodes on one or more remote bus using a higher level in the protocol. This requires that information from one bus pass through a node on that bus and into the controller, which is then sent to a second controller on the other bus. The second controller then places the information on its bus. Such an arrangement is not optimal, for example, each layer in the protocol adds a delay and added complexity to the network. Additionally, there must be some form of arbitration between the two controllers in order to insure that messages are passed from one bus to the others.

SUMMARY OF THE INVENTION

In order to accomplish the present invention, there is provided an interface circuit which has a receive port and a transmit port. The receive and transmit port are used to connect a higher level controller to the bus. There is also a next port having a next-in and a next-out and a previous port having a previous-in and a previous-out. The next and previous ports are used to connect additional interface circuits.

The previous-in receives information from subsequent interface circuits and passes this information to the next-out and to the receive port. The next-in receives information from subsequent interface circuits and passes this information to the previous-out and to the receive port. The transmit port passes received information to the previous-out, the next-out and the receive port. The next-out outputs a dominate state if either the previous-in or transmit port receive a dominate state. The previous-out outputs a dominate state if either the next-in or transmit port receive a dominate state. The receive port outputs a dominate state if either the next-in, previous-in or transmit port receive a dominate state.

There is an alternate embodiment that has an other port having an other-in and an other-out. In this embodiment, the other-in receives information from subsequent interface circuits and passes this information to the next-out, previous-out and the receive port. The other-out receives information from next-in, previous-in and the transmit port. The other-out outputs a dominate state if either the next-in, previous-in or transmit port receive a dominate state. The next-out outputs a dominate state if either the previous-in, other-in or transmit port receive a dominate state. The previous-out outputs a dominate state if either the next-in, other-in or transmit port receive a dominate state. The receive port outputs a dominate state if either the next-in, previous-in, other-in or transmit port receive a dominate state.

There is yet another embodiment which allows for two connections to the bus. This embodiment has a second receive port and a second transmit port. The previous-in passes received information to the second receive port. The next-in passes received information to the second receive port. The second transmit port passes received information to the previous-out, the next-out and the receive port. The second receive port outputs a dominate state is either the next-in, previous-in or transmit port receive a dominate state. The next-out outputting a dominate state if either the previous-in, transmit port or second transmit port receive a dominate state. The previous-out a dominate state if either the next-in, transmit port or second transmit port receive a dominate state. The second receive port outputting a dominate state if either the next-in, previous-in, transmit port or second transmit port receive a dominate state.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
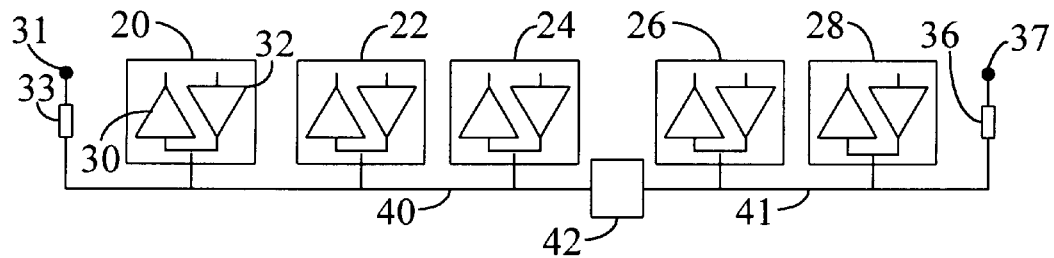
FIG. 1. shows a diagram of a bus system.

The present invention is not limited to a specific embodiment illustrated herein, in particular, the present invention is described using the CAN bus as an example, however the present invention can be used on any wired-AND bus. Referring particularly to FIG. 1, which shows a diagram of a bus system. Three nodes 20, 22, 24 which are capable of transmission as well as reception are connected to a single-channel bus 40. An additional two nodes 26 and 28 are shown on a second bus 41. For this purpose the station 20 comprises a transmitter element 32 and a receiver element 30. The transmitter element 32 is capable of transmitting bits which each fill the time interval of a bit cell, commonly referred to as Non-Returning to Zero (NRZ). The bit cell has a length determined by the local clock element; this length amounts to a number of clock pulses, for example, 4, 8, 16 pulses etc. The buses 40 and 41 have a dominant signal state and a non-dominant signal state. This is symbolized by a resistors 33 and 36 and terminals 31 and 37 which can be connected to a reference potential. It is assumed that the output impedance of the transmitter element 32 is low at least in the dominant signal state which deviates from the reference potential with respect to the resistor 33. The resistor 33 can also be formed by the internal electronic circuitry of a station. Similarly, nodes 26 and 28 can communicate to each other over bus 41. Generally, each transmitter (32) for each node is an open collector output. All receivers (30) on the bus receive a high until a single device on that bus drives the bus low. Once one transmitter drives the line low, no other device can affect the line.

Buses 40 and 41 must be connected through interface 42 to allow nodes on each side to communicate with nodes on the other side. To accomplish this, interface 42 must a) allow both buses to be in the non-dominate state (40 and 41) when all nodes are driving the bus in the non-dominate state; and b) drive the opposite bus to the dominate state when any node drives the bus to the dominate state. Once the buses are galvanically isolated, it is then possible to use other forms of transmission, infrared (IR) for example, between the two buses.

Figure 2:
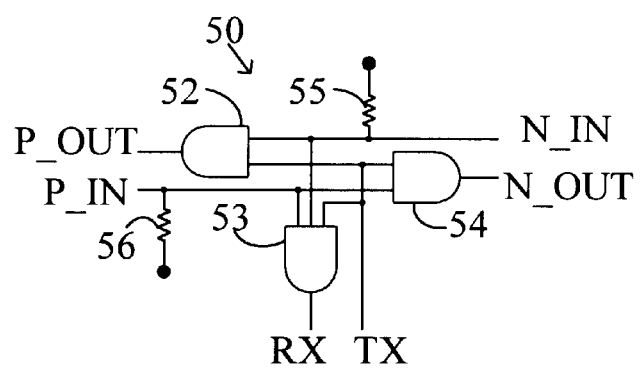
FIG. 2 shows a schematic diagram of an interface circuit in accordance with the present invention.

Referring to FIG. 2 there is shown a schematic diagram of an interface circuit to galvanically isolate any node. Interface circuit 50 allows a device to communicate to other devices using an Wired-AND bus configuration. In particular, the device connects to the RX/TX port. Subsequent interface circuits connect to either the Previous_OUT/Previous_IN (P_OUT/P_IN) or Next_OUT/Next_IN (N_OUT/N_IN) ports. As described above, a wired-AND bus has a dominate and a non-dominate state. The interface circuit uses a low as the dominate state and a high as the non-dominate state.

A device may place the bus in the dominate state by pulling TX to a logic low. Once TX is low, AND gate 53 receives the logic low from the TX line, causing AND gate 53 to output a logic low on RX, independent of what it is receiving on its two other inputs. AND gate 54 receives the logic low from the TX line, causing AND gate 54 to output a logic low on N_OUT, independent of what it is receiving on its other input. Similarly, AND gate 52 receives the logic low from the TX line, causing AND gate 52 to output a logic low on P_OUT, independent of what it is receiving on its other input. If the device drives TX to a logic high, the RX, N_OUT, and P_OUT will output the non-dominate state only if N_IN and P_IN are both receiving the non-dominate state. If however, either N_IN or P_IN are in the dominate state, then RX will remain in the dominate state. Additionally, if for example P_IN is in the dominate state, AND gate 53 receives the logic low from P_IN and outputs a logic low on RX, independent of what it is receiving on its two other inputs. AND gate 54 receives the logic low from the P_IN line, causing AND gate 54 to output a logic low on N_OUT, independent of what it is receiving on its other input. In a similar manner, N_IN affects the RX and P_OUT outputs. Resister 55 and 56 insure that P_IN and N_IN respectively remain in the non-dominate state if no device is connected the port. The truth table below shows the logic of interface circuit 50.

| TX | P_IN | N_IN | RX | P_OUT | N_OUT | Comments |
|---|---|---|---|---|---|---|
| 0 | 0 | 0 | 0 | 0 | 0 | All nodes driving low |
| 0 | 0 | 1 | 0 | 0 | 0 | Present and Previous node driving low |
| 0 | 1 | 0 | 0 | 0 | 0 | Present and Next nodes driving low |
| 0 | 1 | 1 | 0 | 0 | 0 | Present Node driving low |
| 1 | 0 | 0 | 0 | 0 | 0 | Previous and Next node driving low |
| 1 | 0 | 1 | 0 | 0 | 0 | Previous node driving low, which is propagated to Next node |
| 1 | 1 | 0 | 0 | 0 | 0 | Next node driving low, which is propagated to Previous node |
| 1 | 1 | 1 | 1 | 1 | 1 | No node driving low |

Figure 3:
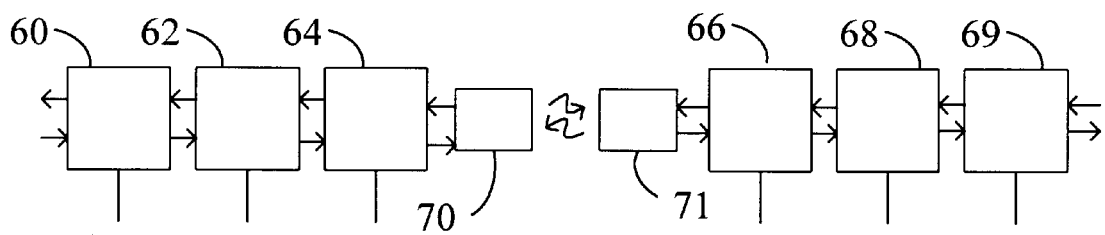
FIG. 3 shows a network incorporating the present invention.

Referring now to FIG. 3, a network incorporating the present invention is shown. Nodes 60–69 each consists of the circuit as shown in FIG. 2. Each node is connected to a neighbor node byway of the P_OUT/P_IN or N_IN/N_OUT. Node 64 is connected to transceiver 70, which may be IR, RF, fiber, telecom, internet, or any other non-galvanically communication media. Transceiver 70 is in communication with a second transceiver 71, which is connected to node 66. Both transceivers 70 and 71 are connected to their respective nodes by way of the P_OUT/ P_IN or N_IN/N_OUT port. Because the circuit of FIG. 2 outputs standard logic signals, interfacing to a transceiver is relatively easy.

Several advantages are realized by placing the transceiver directly on the bus as opposed to using a node to drive the transceiver. Information traveling on the bus experiences a minimum amount of delay as they pass through the transceivers. Any node can communicate with any other node without needing to route through an intermediate node. No additional form of arbitration is needed. Finally, the bus does not experience a lock-up condition.

Figure 4:
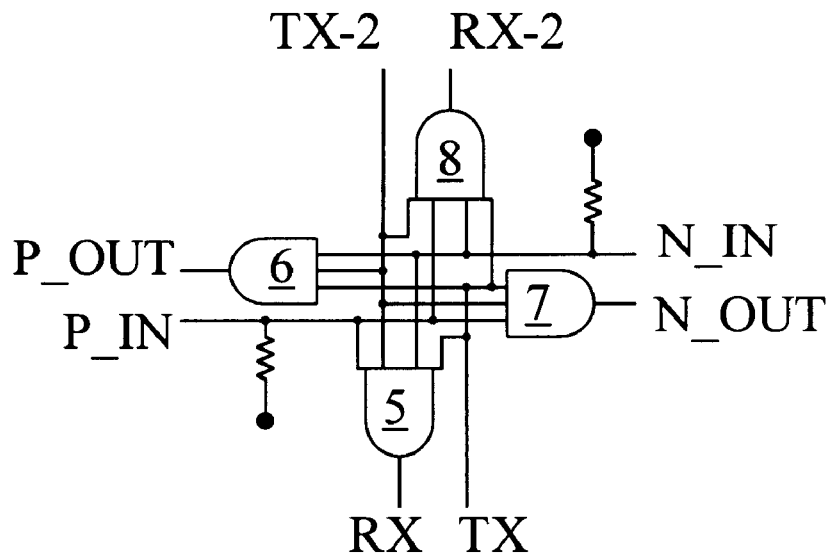
FIG. 4 shows a modification of the circuit in FIG. 2 to provide a second local port.

FIG. 4 shows a modification of the circuit in FIG. 2 to provide a second local port. Thus, using the circuit of FIG. 4, two devices can be connected to a node in the network. A first device connects to RX/TX as in the interface circuit of FIG. 2. A second device may connect to RX-2/TX-2. The P_IN/P_OUT and N_IN/N_OUT ports connect to subsequent interface circuits. One will notice that AND gates 5, 6 and 7 are connected in a similar manner as AND gate 52, 53, and 54 of FIG. 2. However, AND gates 5, 6 and 7 have an additional input for receiving the TX-2 signal. A new AND gate 8 has been added to generate the RX-2 output. The circuit can be expanded to allow any number of ports.

Figure 5:
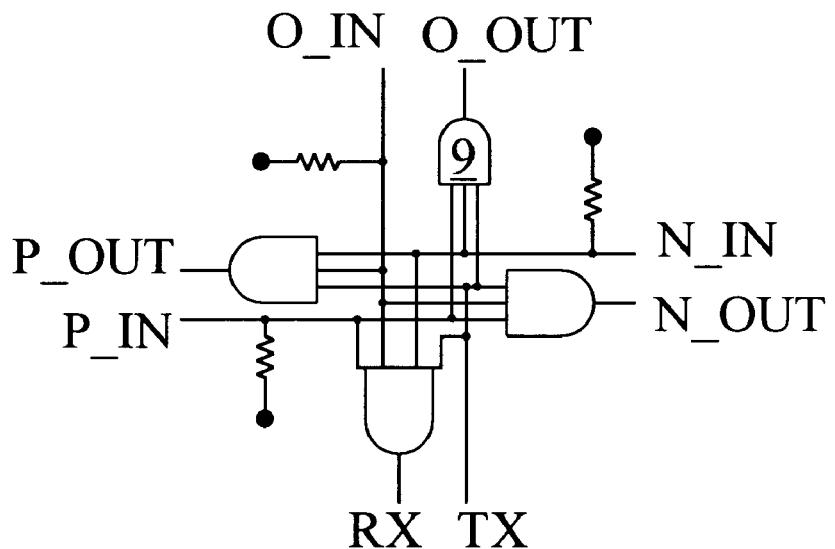
FIG. 5 shows a modification of the circuit in FIG. 4 to provide a third bus port.

FIG. 5 shows a modification of the circuit in FIG. 4 to provide a third bus port. Using the circuit of FIG. 5 another bus can be connected into the node, thereby allowing a star type configuration. As with FIG. 3, a node connects to other nodes byway of the P_IN/P_OUT and N_IN/N_OUT, however, an additional node maybe connected to the O_IN/ O_OUT port. The circuit of FIG. 5 is similar to that of FIG. 4, with two differences. First, AND gate 9 has three inputs, second, a resister has been added to pull-up the O_IN line. As described above, the resister places the O_IN in the non-dominate state if there is no connection to the O_IN/ O_OUT port.

Figure 6:
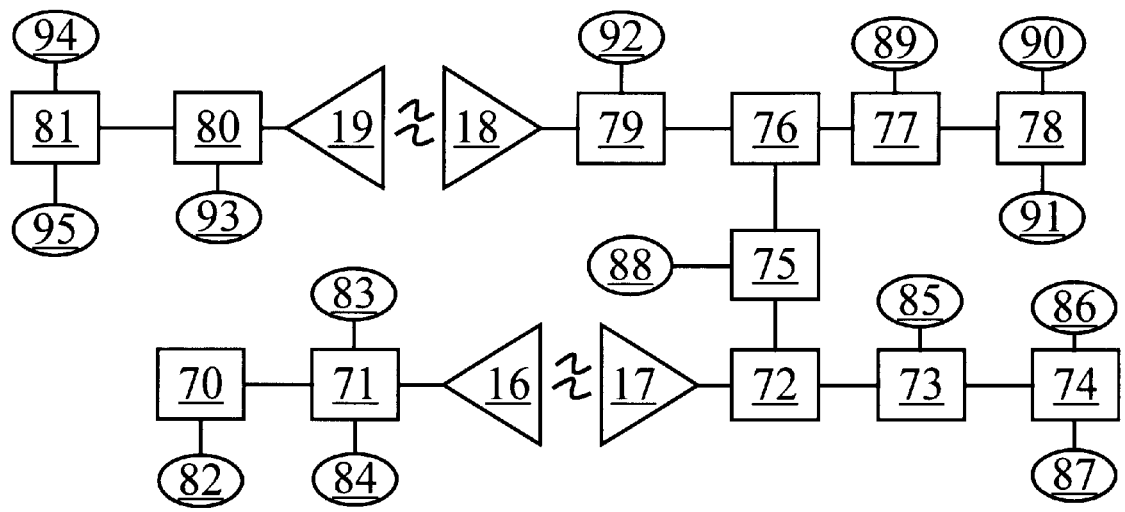
FIG. 6 shows an example of a bus structure using several types of nodes.

By intermixing node types of FIGS. 2, 4 and 5, a complex bus structure can be achieved. Referring to FIG. 6, there is shown an example of a bus structure using several types of nodes. Nodes 70, 73, 75, 77, 79 and 80 are all of the type shown in FIG. 2. Nodes 71, 74, 78 and 81 are all of the type shown in FIG. 4. Nodes 72 and 76 are of the type shown in FIG. 5. Items, identified 82–95, represent devices using the bus structure. Of course, more complicated bus structures are possible. Note, each connection between nodes consists of two connections as shown in more detail in FIG. 3.

Figure 7:
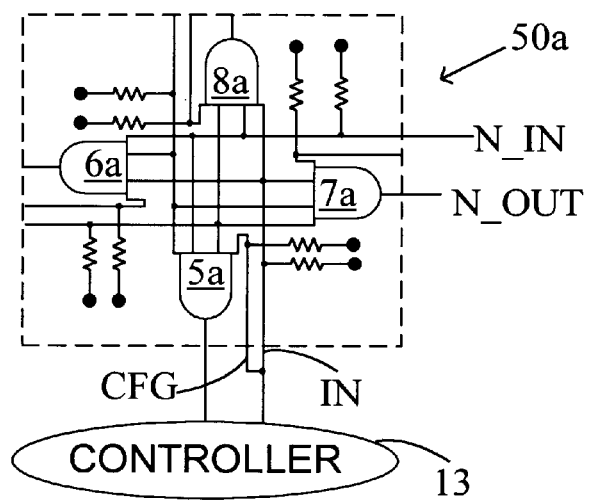
FIG. 7 shows a schematic diagram of an generic interface circuit allowing for user configuration.

As described above, the circuits of FIG. 2, 4 and 5 allow for different number of connections and types. To simplify design of a network, the generic circuit 50a as shown on FIG. 7 can be used. Interface circuit 50a allows the network designer to purchase a quantity of a single part and then configure the part to meet the needs of the particular network. In particular, a controller, such as 13, connects to the interface circuit by connecting the two inputs (IN and CFG) together as shown in FIG. 7. Network port connection, such as N_OUT/N_IN require that the CFG input be pulled to the non-dominate state as shown in FIG. 7 Unused ports have no connection. While FIG. 7 shows the pull-up resister internal, these could be external to the interface circuit. With external resistors, the unconnected inputs must be keep at a the non-dominate state.

Although the preferred embodiment of the invention has been illustrated, and that form described, it is readily apparent to those skilled in the art that various modifications may be made therein without departing from the spirit of the invention or from the scope of the appended claims.

What is claimed is:

1. An interface circuit comprising:
   a receive port;
   a transmit port;
   a first-in;
   a first-out;
   a second-in;
   a second-out;
   the second-in passing received information to the first-out and to the receive port;
   the first-in passing received information to the second-out and to the receive port;
   the transmit port passing received information to the second-out and the first-out;
   the first-out outputting a dominate state if either the second-in or transmit port receive a dominate state;
   the second-out outputting a dominate state if either the first-in or transmit port receive a dominate state; and
   the receive port outputting a dominate state if either the first-in, second-in or transmit port receive a dominate state.

2. The interface circuit of claim 1 further comprising:
   a transceiver connected to the first-in and the first-out.

3. The interface circuit of claim 1 further comprising:
   a controller connected to the receive port and the transmit port.

4. The interface circuit of claim 1 further comprising:
   an third-in;
   an third-out;
   the third-in passing received information to the first-out, second-out and the receive port;
   the third-out receiving information from first-in, second-in and the transmit port;
   the third-out outputting a dominate state is either the first-in, second-in or transmit port receive a dominate state;
   the first-out outputting a dominate state if either the second-in, third-in or transmit port receive a dominate state;
   the second-out outputting a dominate state if either the first-in, third-in or transmit port receive a dominate state; and
   the receive port outputting a dominate state if either the first-in, second-in, third-in or transmit port receive a dominate state.

5. The interface circuit of claim 1 further comprising:
   a second receive port;
   a second transmit port;
   the second-in passing received information to the second receive port;
   the first-in passing received information to the second receive port;
   the second transmit port passing received information to the second-out and the first-out;
   the second receive port outputting a dominate state is either the first-in, second-in or transmit port receive a dominate state;
   the first-out outputting a dominate state if either the second-in, transmit port or second transmit port receive a dominate state;
   the second-out a dominate state if either the first-in, transmit port or second transmit port receive a dominate state; and the second receive port outputting a dominate state if either the first-in, second-in, transmit port or second transmit port receive a dominate state.

6. The interface circuit of claim 5 further comprising:
a first controller connected to the receive port and the transmit port; and
a second controller connected to the second receive port and the second transmit port.

7. An interface circuit for use on a wired-and bus, said interface circuit comprising:
a transmit port;
a first-in;
a second-in;
a first AND gate generating a second-out and connected to the transmit port and to the first-in;
a second AND gate generating a first-out and connected to the transmit port and the second-in; and
a third AND gate generating a receive port and connected to the transmit port, the first-in and the second-in.

8. The interface circuit of claim 7 further comprising:
a transceiver connected to the first-in and the first-out.

9. The interface circuit as claimed in claim 7 further comprising:
a controller connected to the receive port and the transmit port.

10. The interface circuit as claimed in claim 7 wherein:
the first AND gate further connected to a first configuration input;
the second AND gate further connected to a second configuration input; and
the third AND gate further connected to a third configuration input.

11. The interface circuit as claimed in claim 7 further comprising:
an third-in;
a forth AND gate generating an third-out and connected to the transmit port, the first-in and the second-in;
the first AND gate further connected to the third-in;
the second AND gate further connected the third-in; and
the third AND gate further connected to the third-in.

12. The interface circuit as claimed in claim 7 further comprising:
a second transmit port;
a forth AND gate generating a second receive port and connected to the transmit port, the second transmit port, the first-in and the second-in;

the first AND gate further connected to the second transmit port;
the second AND gate further connected the second transmit port; and
the third AND gate further connected to the second transmit port.

13. The interface circuit as claimed in claim 12 further comprising
a first controller connected to the receive port and the transmit port; and
a second controller connected to the second receive port and the second transmit port.

14. An interface circuit for use on a wired-and bus, said interface circuit comprising:
a first-in;
a second-in;
a third-in
a first AND gate generating a first-out and connected to the second-in and to the third-in and further connected to a first config-in;
a second AND gate generating a second-out and connected to the first-in and the third-in and further connected to a second config-in; and
a third AND gate generating a third-out port and connected to the first-in and the second-in and further connected to a third config-in.

15. The interface circuit as claimed in claim 14 wherein:
connecting the first config-in to the first-in to configure the first-in and the first-out to connect to a first controller, leaving the first config-in unconnected to configure the first-in and the first-out to connect to subsequent interface circuits;
connecting the second config-in to the second-in to configure the second-in and the second-out to connect to a second controller, leaving the second config-in unconnected to configure the second-in and the second-out to connect to subsequent interface circuits; and
connecting the third config-in to the third-in to configure the third-in and the third-out to connect to a third controller, leaving the third config-in unconnected to configure the third-in and the third-out to connect to subsequent interface circuits.

* * * * *